Dec. 18, 1934.     W. DE BACK     1,984,672
FRUIT SIZER
Filed July 30, 1930     5 Sheets-Sheet 1

INVENTOR.
William de Back
BY
Graham
ATTORNEYS.

Dec. 18, 1934. W. DE BACK 1,984,672
FRUIT SIZER
Filed July 30, 1930 5 Sheets-Sheet 2

INVENTOR.
William de Back.
BY
ATTORNEYS.

Dec. 18, 1934.  W. DE BACK  1,984,672
FRUIT SIZER
Filed July 30, 1930   5 Sheets-Sheet 3

INVENTOR.
William de Back.
BY
ATTORNEYS.

Dec. 18, 1934.  W. DE BACK  1,984,672
FRUIT SIZER
Filed July 30, 1930  5 Sheets-Sheet 4

INVENTOR.
William de Back.
BY
T. T. Graham
ATTORNEYS.

Dec. 18, 1934.   W. DE BACK   1,984,672
FRUIT SIZER
Filed July 30, 1930   5 Sheets-Sheet 5
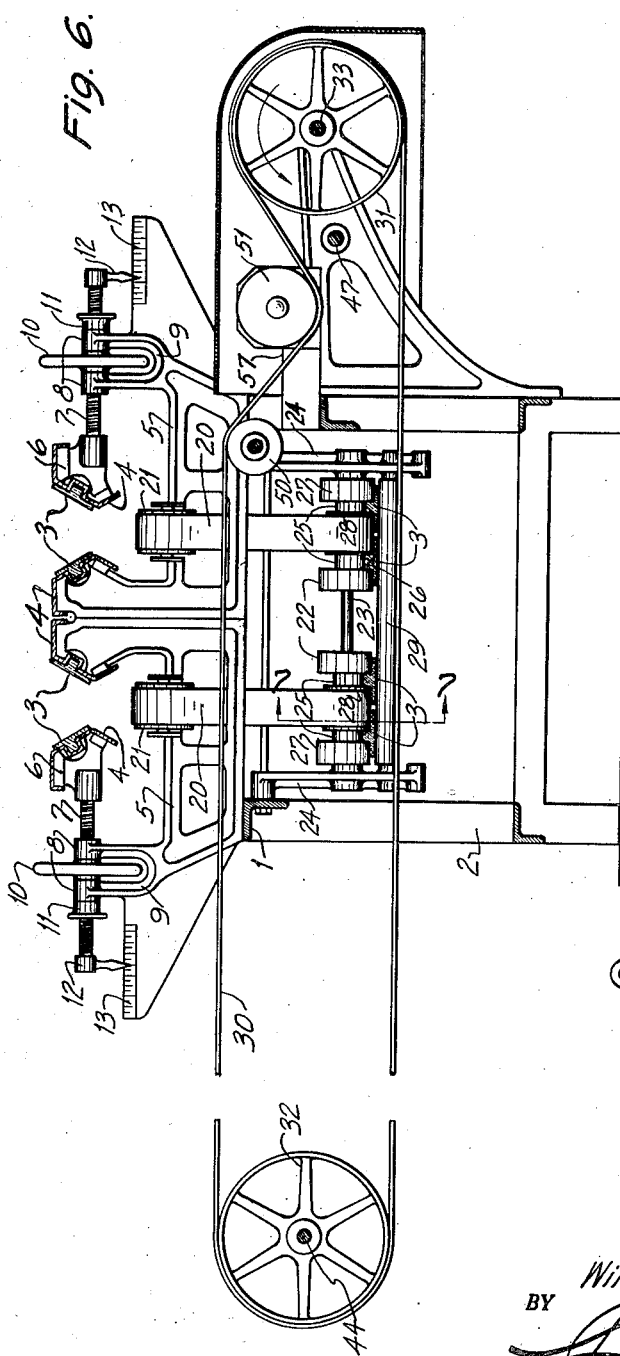
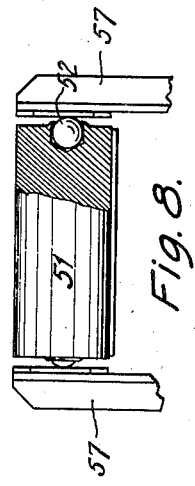
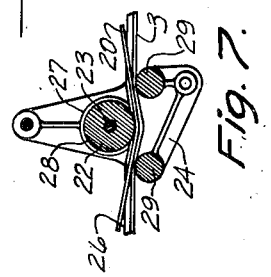
INVENTOR.
William de Back
BY
ATTORNEYS.

Patented Dec. 18, 1934

1,984,672

UNITED STATES PATENT OFFICE 1,984,672

FRUIT SIZER

William de Back, San Jose, Calif., assignor to Food Machinery Corporation, San Jose, Calif., a corporation of Delaware Application July 30, 1930, Serial No. 471,804

6 Claims. (Cl. 209—102)

The present invention relates to the art of grading fruit and vegetables according to size and while apparatus embodying the invention is suitable for general use in sizing all kinds of fruit and vegetables, it is peculiarly well adapted for use in sizing such soft fleshed fruits as pears, peaches, apricots, plums, citrus fruits, etc., which must be handled with extraordinary care in order to prevent damage thereto.

The invention particularly relates to that type of sizing machine wherein a pair of travelling belts serve to support and carry the fruit until the point of discharge for fruit of a particular size shall have been reached, at which point the belts will have diverged sufficiently to permit the release of the fruit supported thereon and deposit it in that group to which it belongs.

In the preferred embodiment of my invention I provide a supplementary carrier belt positioned below the sizing belts which receives the fruit after its release from the sizing belts. In order to insure gentle handling of the fruit as it is transferred from the sizing belts to the carrier belt and also to maintain the pieces of fruit in the same relative positions with respect to each other, means are provided for operating the carrier belt at the same speed as the sizing belts. Such means may take various forms but in the embodiment illustrated herein it comprises a plurality of rollers so mounted that all the belts can be fed therethrough, whereby they are frictionally interengaged and thus necessarily assume the same speeds.

It is, therefore, an object of my invention to provide in a fruit sizing apparatus a pair of travelling sizing belts in combination with a supplementary carrier belt underneath said sizing belts which will gently receive the fruit as it is released from the sizing belts and deposit it upon a packing conveyor.

More particularly, it is an object to construct such an apparatus wherein a carrier belt is driven at the same speed as the sizing belts, thus reducing damage to fruit which would otherwise occur in the transfer.

Another object is to construct such an apparatus wherein the carrier belt is driven by means of frictional engagement with the sizing belts.

Further objects and advantages will become apparent as the description proceeds in connection with the accompanying drawings, in which:—

Figure 6 is a cross-section taken along the line 6—6 Figure 2.

Figure 7 is a cross-section of the carrier belt drive mechanism taken along the line 7—7, Figure 6.

Figure 8 is a detail of the means for taking up slack in the packing belts.

Figure 1:
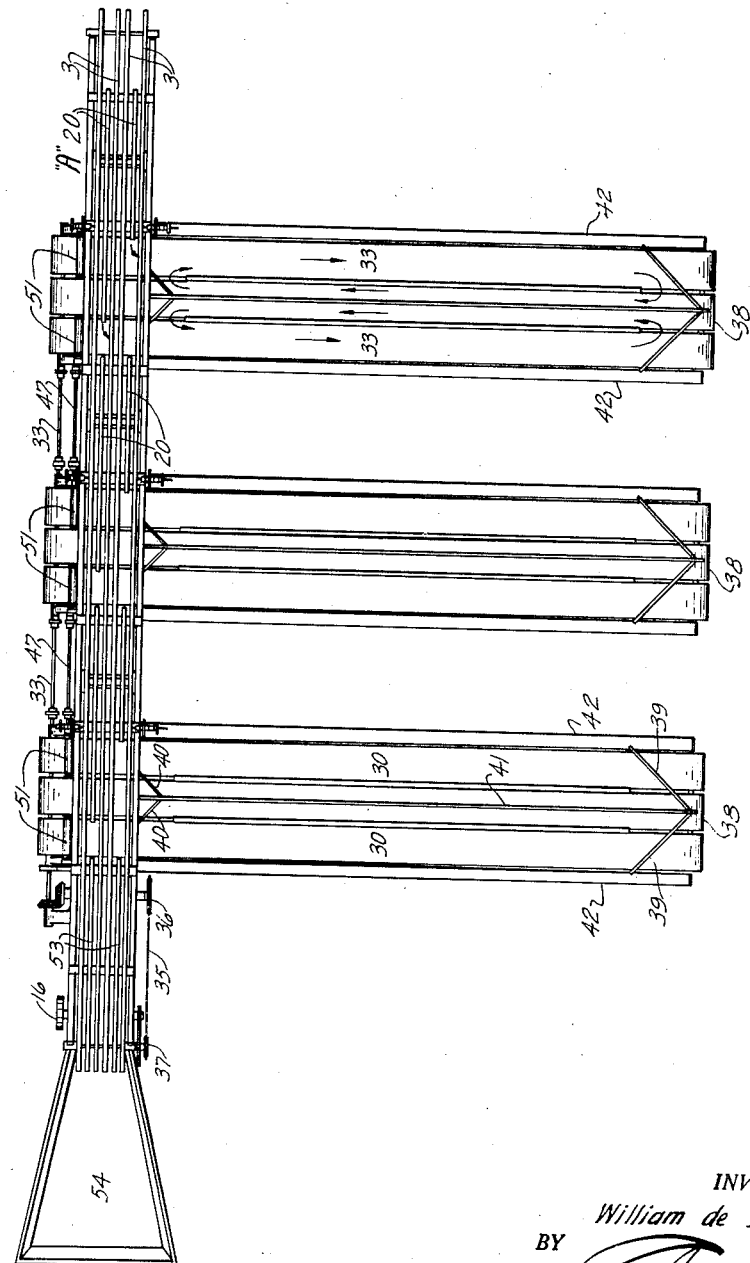
Figure 1 is a plan view of fruit sizing apparatus embodying my invention.
Figure 2:
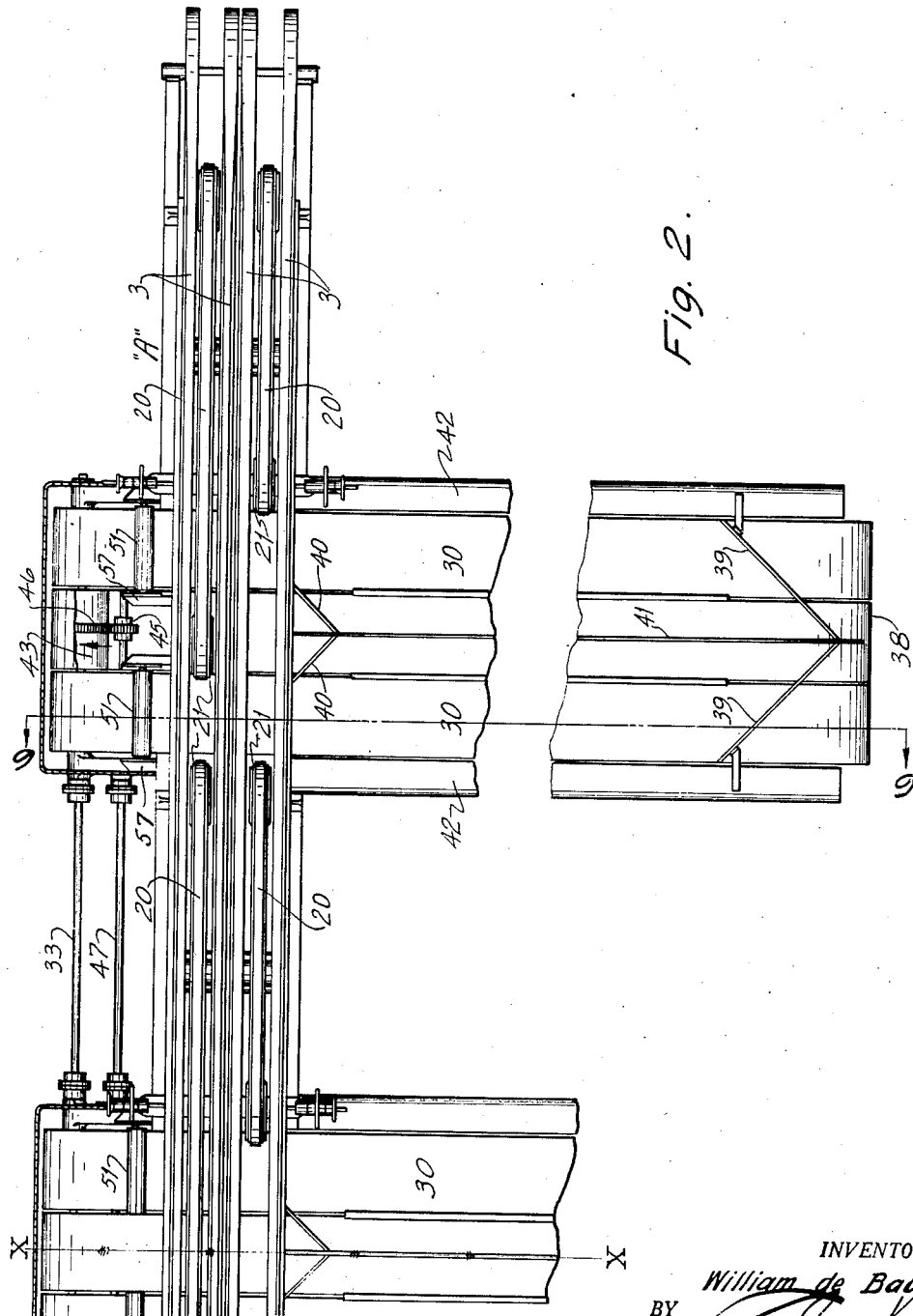
Figure 2 is a plan view of the right-hand portion of the apparatus shown in Figure 1, drawn to a larger scale.
Figure 3:
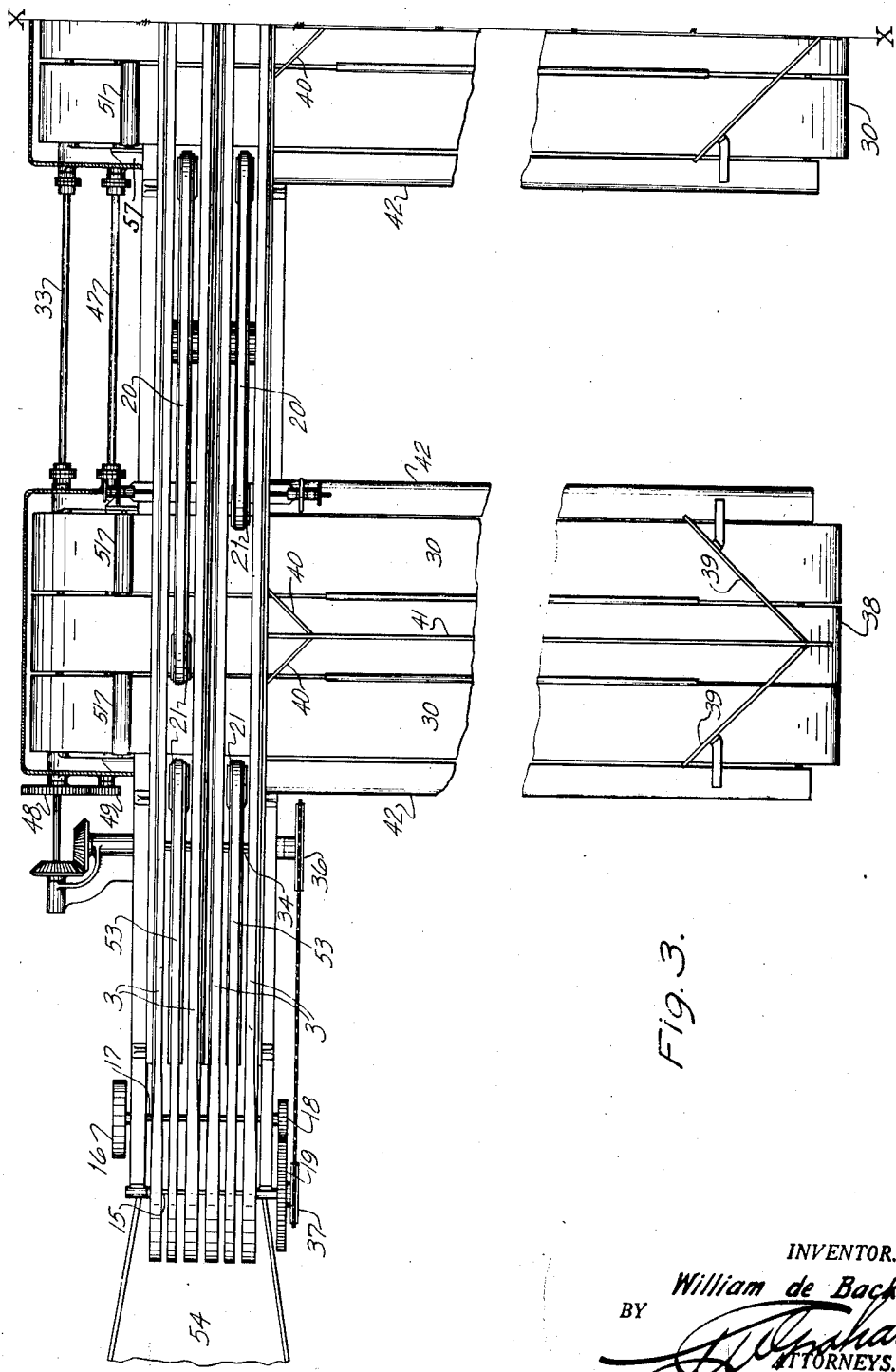
Figure 3 is a plan view of the left-hand portion of the apparatus shown in Figure 1, drawn to a larger scale.
Figure 4:
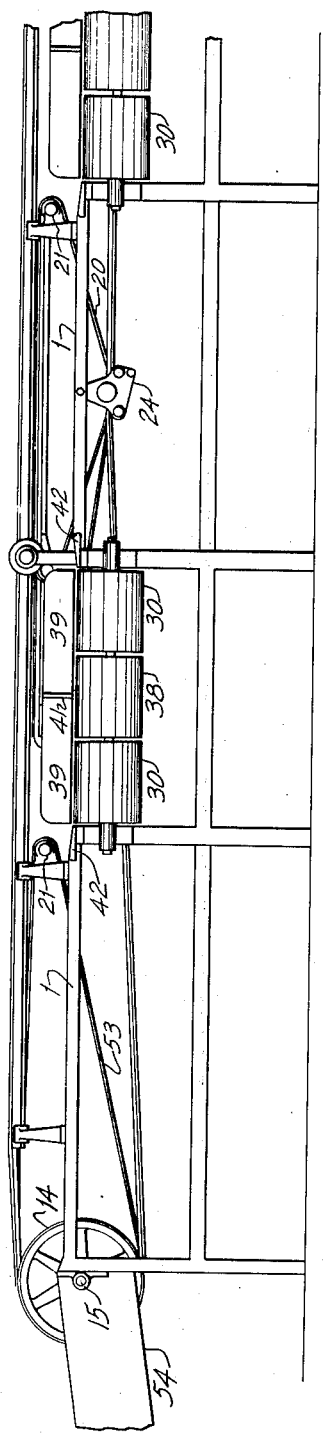
Figure 4 is a side elevation of the apparatus shown in Figure 3.
Figure 5:
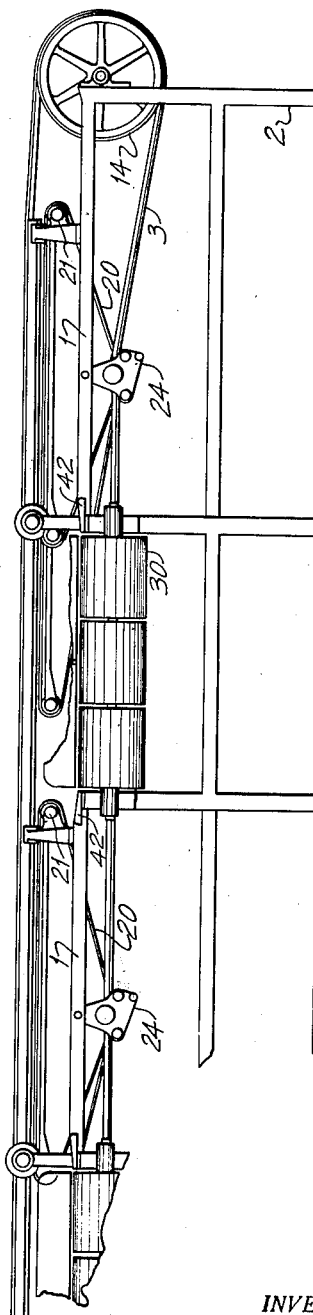
Figure 5 is a side elevation of the apparatus shown in Figure 2.

It is the customary practice to grade the fruit as to quality before grading as to size and the apparatus shown herewith is adapted to size simultaneously two qualities of fruit. To this end there are provided two sets of sizing apparatus mounted side by side upon the frame 1 which is supported by the legs 2.

As shown, the sizing means consists of two pairs of moving belts 3, having their working faces angularly disposed so as to form open bottomed troughs as best illustrated in Figure 6. These belts are T shaped and are supported by, and operated in the metal guides 4 which extend approximately the entire length of the apparatus. The guides are carried by the brackets 5 which are mounted at spaced intervals upon the frame 1, the center guides being stationary and fixed to the brackets, while the outer ones are supported by adjustable mountings whereby they may be moved relative to the center guides in order to adjust the distance between the bottoms of the sizing belts 3. Each adjustable mounting comprises the support 6 mounted on the end of the screw 7 which passes through the bearing 8 provided in the ends of the U shape brackets 9. The bearings are smooth bored by the handwheel 10 is threaded whereby rotation thereof will cause axial movement of the screw 1. The locknut 11 serves to lock the screw in any desired position and the position is at all times registered on the scale 13 by the pointer 12.

The sizing belts 3 run over the pulleys 14 at each end of the frame and may be driven in any suitable manner. In the construction shown the pulleys at one end of the machine are mounted on the shaft 15, driven from any source of power through the medium of the pulley 16, shaft 17, and gears 18 and 19.

In order to catch fruit which has fallen through the sizing belts and deposit it with its proper group, there are provided the carrier belts 20 mounted directly under the openings between the sizing belts 3. These belts operate in guides (not shown) mounted on the brackets 5 and run over the pulleys 21.

It is of the greatest importance that the carrier belts 20 shall run at substantially the same speed as the sizing belts as otherwise when the fruit has settled down between the sizing belts to such an extent that it is partially supported by both the sizing belts and the carrier belts it may be damaged by the rubbing or dragging due to the relative movement of the belts. Moreover, the operation of the belts at the same speed insures that fruit received by the carrier belt will maintain its position with respect to fruit not yet released from the sizing belts, thus precluding the latter from falling upon or against other fruit already deposited upon the carrier belt.

To the end that the belt speeds may be equal, I have devised a novel drive means best shown in Figures 6 and 7. This means comprises the rollers 22 mounted on the shaft 23, secured to the hangers 24 which are pinned to the frame 1 either rigidly or so that they may oscillate relative thereto. The rollers 22 are provided with grooves 25 which are adapted to receive the tongues 26 on the rear of the sizing belts 3, and the carrier belts 20 are so mounted that they contact with that portion 28 of the rollers between the grooves 25. The shoulders 27 on the rollers are of a larger diameter than the portion 28 in order that the sizing belts may lie flat when they press the carrier belt to the face of the rollers as shown in Figures 6 and 7. In order to insure adequate pressure of the belts 3 against the rollers 22 and also to increase the area of the contact, the rollers 29 are mounted on the hangers 24 in such manner that when the slightest tension is placed on the sizing belts, they cause them to be pressed against the rollers 22 and the carrier belts 20, the resulting friction between the belts causing the carrier belts to be driven by the sizing belts and at the same speed.

At suitably spaced intervals, the packing belts 30 are positioned beneath the sizing belts 3. It will be obvious that any number of such belts may be provided but in the apparatus illustrated, I have shown three sets, each set consisting of two belts, one for each grade of fruit. The packing belts 30 are supported by the pulleys 31 and 32, the pulleys 31 being driven by the shaft 33 driven by means of bevel gears from shaft 34. The shaft 34 is operated by the sprocket chain 35 passing over sprocket wheels 36 and 37.

Between the packing belts of each set operates a return belt 38 which moves in a direction opposite to the packing belts and these belts, in conjunction with the deflector barriers 39 and 40 operate to circulate the fruit in an obvious manner. The partition 41 serves to maintain the separation between the two grades of fruit and the shoulders 42 prevent fruit from rolling off the packing belts. The return belts 38 are supported on the pulleys 43 which are loosely mounted on the shafts 33 and 44. The pulleys 43 are driven in the direction indicated by the pinions 45, meshing with the gears 46 set in the faces of the pulleys. The pinions 45 are secured to the shaft 47 which is operated from shaft 33 by gears 48 and 49.

It will be noted that a corresponding carrier belt is provided for each packing belt, the delivery ends of the carrier belts being positioned so as to deposit fruit on the proper packing belt. At the extreme left end of the machine are the carrier belts 53 which serve to receive all fruit which is too large to be deposited on the carrier belts 20. Fruit received by these belts is carried to the end of the machine and deposited into the overflow bin 54. These belts are not driven in the same manner as the others but are driven by pulleys fixed to the shaft 15.

In order that the packing belts may be driven from the sizing end of the machine and at the same time may be kept taut, I have devised a novel means for taking up the slack, which has been made the subject matter of my co-pending application Serial No. 471,803 filed July 30, 1930. Under each packing belt, near the driven end is placed a supporting roller 50 and between the guides 57 is positioned the weighted roller 51. This roller 51 is provided in each end with a ball-bearing 52, (see Fig. 8) which serves to reduce friction and at the same time allow a certain amount of displacement of the roller. The weight of the roller is such that it takes up the slack of the packing belt and in doing so assumes a position lower than the upper edge of the driving pulley 31 whereby it maintains its proper position and cannot roll off.

In operation, the fruit is ordinarily graded as to quality before being run through the sizing apparatus although it will be obvious that this may be done after the fruit has been graded according to size. Assuming, however, that the fruit has been graded into two grades of quality, one grade is fed to one of the pairs of sizing belts and the other is fed to the remaining pair. The fruit is fed to the sizing belts at the point indicated at "A" by any suitable means. The moving sizing belts 3 carry the fruit toward the left and as it progresses the belts diverge to a certain predetermined extent, depending upon the setting of the screws 7. That fruit of a size small enough to fall through the sizing belts is received by the carrier belts 20 which carry it to the proper packing belts and deposit it thereon.

As previously described, the sizing belts and the carrier belts are moving at the same speed so that the fruit is transferred from the former to the latter in such a gentle manner so as to avoid all damage thereto. This result is accomplished by reason of the fact that no scraping or rubbing occurs in the transfer, and fruit carried by the carrier belt maintains its position with respect to that carried by the sizing belts so that no collisions can occur. As soon as the fruit is deposited upon a packing belt it is immediately carried away from under the sizing and carrier belts so that the next fruit cannot fall upon fruit already deposited but will fall upon a clear portion of the packing belt. Any fruit which may be carried past the packers will be deflected by the barriers 39 onto the return belts 38 which circulate the fruit back to the packing belts whereby it again passes before the packers.

All fruit which is too large to be deposited on the packing belts is carried to the carrier belts 53 which deposit it in the overflow bin 54 at the end of the machine.

Having thus described my invention, what I claim is new and desire to secure by Letters Patent, is:—

1. An apparatus of the class described, comprising a pair of endless longitudinally divergent sizing belts having their working faces angularly disposed, one toward the other, means for driving the same at a common speed and a carrier belt positioned beneath said sizing belts to receive and convey sized fruit which has fallen free from engagement with the sizing elements and driven by frictional driving contact therewith.

2. In a fruit grading machine, a pair of longitudinally divergent sizing belts, a carrier belt therebeneath, and means whereby the carrier belt is driven by said sizing belts, said means comprising a roller and means whereby the sizing belts are caused to overlap the carrier belt and press it against said roller whereby the carrier belt and sizing belts are frictionally engaged.

3. In a fruit grading machine, a pair of sizing belts, a carrier belt and means whereby the carrier belt is driven by said sizing belts, said means comprising a roller having a portion of reduced diameter whereby shoulders are formed thereon, said carrier belt being adapted to be received in said reduced portion, and said sizing belts being so disposed as to bear upon said shoulders and overlap said sizing belts.

4. In a fruit grading machine, a pair of longitudinally divergent sizing belts, a carrier belt therebeneath and means whereby the carrier belt is driven by said sizing belts, said means comprising a main roller against which the belts are adapted to bear and a pair of auxiliary rollers mounted upon opposite sides of said main roller in such manner as to maintain said belts in frictional engagement with said main roller and cause said carrier belt to be frictionally engaged by said sizing belts.

5. In a fruit grading machine, a pair of flat faced sizing belts provided with longitudinal tongues in their rear faces, a carrier belt and means whereby said carrier belt is frictionally driven by said sizing belts, said means comprising a roller having a middle portion of reduced diameter whereby a pair of shoulders are formed thereon, grooves in said portion of reduced diameter for the reception of said tongues, said carrier belt being so disposed as to bear against said reduced portion between said grooves and said sizing belts being so mounted that their tongues rest in said grooves, while their rear flat portions rest upon said shoulders and upon said carrier belt.

6. A fruit sizing apparatus comprising a pair of longitudinally divergent sizing belts, means for driving the same at a common speed, and a carrier belt disposed beneath said sizing belts in position to receive and convey fruit which has fallen free from engagement with the sizing elements, and having a portion arranged in driving contact with said sizing belts whereby the carrier belt is driven by the sizing belts in the same direction and at the same speed.

WILLIAM DE BACK.